(12) United States Patent
Chen et al.

(10) Patent No.: US 12,165,184 B2
(45) Date of Patent: *Dec. 10, 2024

(54) MULTI-CHANNEL MESSAGE EXCHANGE SYSTEM

(71) Applicant: Twilio Inc., San Francisco, CA (US)

(72) Inventors: Chloe Chen, San Carlos, CA (US); Peter Michael Janovsky, Pleasanton, CA (US)

(73) Assignee: Twilio Inc., San Francisco, CA (US)

( * ) Notice: Subject to any disclaimer, the term of this patent is extended or adjusted under 35 U.S.C. 154(b) by 460 days.

This patent is subject to a terminal disclaimer.

(21) Appl. No.: 17/453,998

(22) Filed: Nov. 8, 2021

(65) Prior Publication Data

US 2023/0148343 A1    May 11, 2023

(51) Int. Cl.
  *G06Q 30/00* (2023.01)
  *G06Q 30/0601* (2023.01)
  *G06Q 30/08* (2012.01)
  *H04L 45/85* (2022.01)
  *H04L 65/80* (2022.01)

(52) U.S. Cl.
  CPC ......... *G06Q 30/0611* (2013.01); *G06Q 30/08* (2013.01); *H04L 45/85* (2022.05); *H04L 65/80* (2013.01)

(58) Field of Classification Search
  CPC ..................................................... G06Q 30/00
  See application file for complete search history.

(56) References Cited

U.S. PATENT DOCUMENTS

| | | | | |
|---|---|---|---|---|
| 6,134,589 A | * | 10/2000 | Hultgren | H04L 9/40 709/227 |
| 6,487,172 B1 | * | 11/2002 | Zonoun | H04L 45/04 370/449 |
| 2014/0064474 A1 | * | 3/2014 | Mathur | G06Q 10/10 379/265.09 |
| 2016/0286355 A1 | * | 9/2016 | Shur | H04W 4/025 |
| 2020/0193447 A1 | * | 6/2020 | Jaiswal | H04M 3/5191 |

OTHER PUBLICATIONS

Kearl, Mary, "The Road to SMS Marketing: How to Get Started", Braze, dated Sep. 2, 2020 (Year: 2020).*

* cited by examiner

*Primary Examiner* — Mark A Fadok
(74) *Attorney, Agent, or Firm* — Schwegman Lundberg & Woessner, P.A.

(57) ABSTRACT

A multi-channel message exchange system selects a service provider that is best suited to deliver each individual message for customers of the message exchange system. The message exchange system selects a service provider based on customer criteria provided by the customer, data structures provided by the service providers, quality scores describing performance of the service providers, channels used by the service providers to deliver messages, or any suitable combination thereof. The message exchange system may select the service provider that provides the best combination of quality of service, value, and delivery channel given the customer's specific needs. The data structures may geographic jurisdictions in which the service provider provides message delivery, channels through which the service provider is willing to deliver messages, or any suitable combination thereof.

20 Claims, 9 Drawing Sheets

CRITERIA TABLE 510

| ACCOUNT | CHANNEL | MAX PRICE | MIN QUALITY | PRICE WEIGHT | CHANNEL WEIGHT |
|---|---|---|---|---|---|
| 1 | SMS | .006 | 4 | 1.2 | 1 |
| 1 | EMAIL | .004 | 3 | 1 | 1.2 |
| 1 | VOICEMAIL | .005 | 5 | 0.6 | 0.8 |
| 2 | ANY | .100 | 5 | 1 | 1 |

BID TABLE 540

| PROVIDER ID | CHANNEL | REGION | ROUTE | BID PRICE |
|---|---|---|---|---|
| 1 | SMS | USA | 1 | .005 |
| 1 | SMS | USA | 2 | .003 |
| 2 | VOICEMAIL | USA | 3 | .003 |
| 2 | MMS | ANY | 3 | .010 |

QUALITY TABLE 570

| PROVIDER ID | ROUTE ID | CHANNEL | QUALITY SCORE |
|---|---|---|---|
| 1 | 1 | SMS | 10 |
| 1 | 2 | SMS | 8 |
| 2 | 3 | VOICEMAIL | 6 |
| 2 | 3 | MMS | 4 |

*FIG. 5*

MULTI-CHANNEL MESSAGE EXCHANGE SYSTEM

TECHNICAL FIELD

An embodiment of the present subject matter relates generally to messaging and, more specifically, to a multi-channel message exchange system.

BACKGROUND

Message delivery service providers provide message delivery functionality to customers. For example, service providers charge customers a fee for each message delivered by the service provider to an intended recipient. Customers may select which service provider to use based on the price and/or performance offered by the service providers. That is, a customer may enter into a contractual agreement with a service provider for a fixed period of time during which the service provider provides message delivery services for the customer.

Currently, customers engage with service providers prior to a service provider providing message delivery services for the customer. For example, a customer may gather quotes and information from multiple service providers and then select a service provider that best fits the customer's needs. Similarly, service providers may provide customers a bid based on project parameters provided by the customer during the selection process.

Once a selection has been made and a customer enters into a contractual relationship with a service provider, the customer uses the selected service provider until the contract is terminated by either party or the term of the contract expires. As a result, both the customer and the selected service provider are bound by the contractual agreement without the ability to adjust the bid and/or service criteria.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 is a block diagram of an example database schema, suitable for selecting a service provider to deliver a message based on customer criteria.

DETAILED DESCRIPTION

Figure 1:
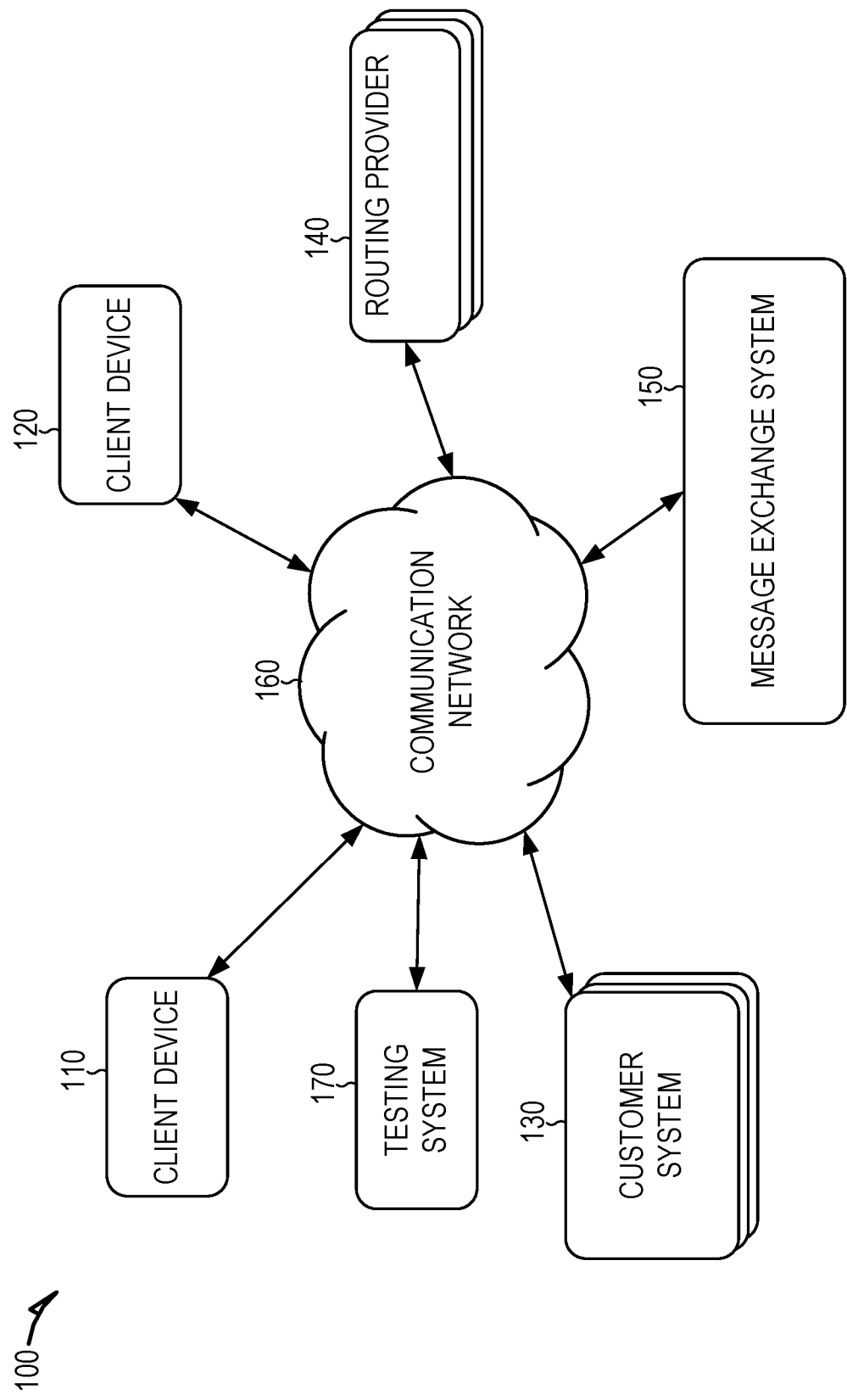
FIG. 1 shows an example system for selecting a service provider to deliver a message based on customer criteria, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

As used herein, the term channel refers to communication delivery channels. Different communication delivery channels use different technologies to deliver messages. Example channels include the short message service (SMS), email, the multimedia messaging system (MMS), voicemail, and proprietary channels such as WeChat™, WhatsApp™, and iMessage™. By contrast, a route refers to a communication delivery path, defined by a series of computers and routers through which the communication is transferred from a source computer to a destination computer. Thus, the same route may be used to transfer messages using different channels, and the same channel may be used to transfer messages using different routes. In some example embodiments, different channels correspond to different applications on a receiving device. For example, a smart phone may have one app to handle SMS messages, another app to handle email, and a third app to handle voicemail. Alternatively, some applications may handle multiple channels. For example, one app may handle both SMS and MMS messages.

A multi-channel message exchange system selects a service provider that is best suited to deliver each individual message for customers of the message exchange system (e.g., online services, retailer, banks, and the like). For example, the message exchange system selects a service provider based on customer criteria provided by the customer with the message to be delivered, bids provided by the service providers, quality scores describing performance of the service providers, applications used by the service providers to deliver messages, or any suitable combination thereof. Selecting a service provider per message provides customers with the ability to utilize the services of multiple service providers based on the current needs of the customer and performance/offering of the service providers. For example, the message exchange system may select (e.g., in real-time, upon receipt of a request to deliver a message being received from a device of a customer) the service provider that provides the best combination of quality of service, bid price, and delivery application given the customer's specific needs. The message exchange system also provides service providers with an opportunity to deliver messages for a larger number of customers by modifying their bid prices and/or quality of service to meet customer needs. For example, a service provider may lower their bid prices, increase their quality of service, and/or add support for additional delivery applications (e.g., in real-time, based on current availability of computing resources, including bandwidth, processing power, memory, and so on, of the service provider) in an effort to increase their chances of being selected to deliver messages.

The customer criteria included with a message include data describing the customer's preferences for message delivery. For example, the customer criteria may indicate a minimum level of service (e.g., deliverability, latency, or both), maximum cost value to deliver a message, preferred delivery applications (e.g., email, SMS message, a proprietary messaging system, or any suitable combination thereof), preference between cost and quality, or any suitable combination thereof.

Similarly, the multi-channel message exchange system allows service providers to provide and/or modify bids for delivering messages. For example, the bids may include a cost value indicating a monetary value (e.g., minimum monetary value) at which the service provider is willing to deliver messages, geographic jurisdictions in which the service provider provides message delivery, delivery applications through which the service provider is willing to deliver messages, or any suitable combination thereof (e.g., different costs for different jurisdictions, delivery applications, or combinations thereof). The bids from the service providers may be received in advance or in response to the message delivery request from the customer.

The multi-channel message exchange system maintains a quality index that describes the quality of service provided by each service provider. For example, the quality index includes individual quality scores determined for each service provider. Each quality score may indicate the estimated likelihood that a message transmitted by the service provider or specific route provide by the service provider will successfully be delivered to its intended recipient. The message exchange system calculates each quality score based on feedback data and/or performance testing data for each service provider. The feedback data is data describing the service providers actual performance delivering messages that have been allocated to the service provider for delivery. For example, the feedback data includes data describing whether the service provider transmitted the messages to their intended recipients, whether the messages were successfully received by their intended recipients, whether the messages resulted in a specified action by the recipients, an amount of time that elapsed until the messages were transmitted by the service provider, an amount of time that elapsed until the messages were received by the recipients, or any suitable combination thereof. In some example embodiments, the quality index is maintained on a per-channel basis. For example, a service provider may have a high quality index for SMS messages but a low quality index for email messages.

The performance testing data describes the tested performance of the service providers. For example, tests of the service provider networks are conducted during which test messages and/or synthetic messages are transmitted using routes provided by the service provider. The performance testing data describes the tracked performance of the test messages, such as whether the test messages were transmitted, received and/or resulted in a specified response, and the elapsed time for the test messages to be transmitted and/or received. In some example embodiments, the performance testing data is maintained on a per-channel basis, allowing a service provider to test highly for one channel and poorly for another.

The multi-channel message exchange system calculates a quality score for each service provider based on the feedback data, performance testing data for the service provider, or both. Multiple quality scores may be maintained for service providers providing multiple channels, with one quality score for each channel. The resulting quality scores indicate the performance level of the service provider such as by indicating the likelihood that a message transmitted by the service provider, delivery application of the service provider, or specific route of the service provider will be received by its intended recipient. The message exchange system may update the quality scores in the quality index periodically to reflect the current performance of each service provider, delivery application, or offered route.

When the multi-channel message exchange system receives a request from a customer to deliver a message, the multi-channel message exchange system initially accesses the customer criteria corresponding to the customer and uses the accessed customer criteria to enrich the received request. For example, the multi-channel message exchange system appends the customer criteria to the request, resulting in an enriched request. The multi-channel message exchange system provides the enriched request to an auction engine, which uses the customer criteria along with the bids and quality index to rank the bids based on the specific needs of the customer. The multi-channel message exchange system may calculate a ranking value for each bid based on the cost value associated with the bid, the quality score of the associated service provider, and the customer criteria. For example, the message exchange system may apply different weights to the quality score and/or cost value based on the customer criteria and then calculate the ranking value based on the weighted quality score and/or cost value. As a result, the quality scores will have a greater impact on the resulting ranking values for a customer that places a higher value on quality of service, while the cost value will have a greater impact on the resulting ranking values for a customers that place a higher value on cost. Accordingly, the ranking values for the bids will vary based on the preferences of the customers.

The multi-channel message exchange system selects a bid based on the resulting ranking values. For example, the multi-channel message exchange system selects the bid that is ranked the highest based on the ranking values. The multi-channel message exchange system may also select a final price at which to charge for delivering the message, such as the cost value associated with the selected bid or a cost value associated with a second ranked bid. The multi-channel message exchange system then transmits the message to its intended recipient via the service provider and channel associated with the selected bid.

FIG. 1 shows an example system 100 for selecting a service provider to deliver a message based on customer criteria, according to some example embodiments. As shown, multiple devices (i.e., client device 110, client device 120, customer system 130, service provider 140, message exchange system 150, and testing system 170) are connected to a communication network 160 and configured to communicate with each other through use of the communication network 160. The communication network 160 is any type of network, including a local area network (LAN), such as an intranet; a wide area network (WAN), such as the Internet; a telephone and mobile device network, such as a cellular network; or any combination thereof. Further, the communication network 160 may be a public network, a private network, or a combination thereof. The communication network 160 is implemented using any number of communication links associated with one or more service providers, including one or more wired communication links, one or more wireless communication links, or any combination thereof. Additionally, the communication network 160 is configured to support the transmission of data formatted using any number of protocols.

Multiple computing devices can be connected to the communication network 160. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users may interact with a customer system 130 to utilize online services provided by a customer. Users communicate with and utilize the functionality of the customer system 130 by using the client devices 110 and 120 that are connected to the communication network 160 by direct and/or indirect communication. The customer may provide any type of service, whether it be online or offline, and the customer system 130 may facilitate any related service that is provided online, such as a ride-sharing service, reservation service, retail service, news service, and so forth.

Although the shown system 100 includes only two client devices 110, 120 and one customer system 130, this is only for ease of explanation and is not meant to be limiting. One skilled in the art would appreciate that the system 100 can include any number of client devices 110, 120 and/or customer systems 130. Further, each customer system 130 may concurrently accept communications from and initiate communication messages and/or interact with any number of client devices 110, 120, and support connections from a variety of different types of client devices 110, 120, such as desktop computers; mobile computers; mobile communications devices, e.g., mobile phones, smart phones, tablets; smart televisions; set-top boxes (STBs); and/or any other network enabled computing devices. Hence, the client devices 110 and 120 may be of varying type, capabilities, operating systems, and so forth.

A user interacts with a customer system 130 via a client-side application installed on the client devices 110 and 120. In some embodiments, the client-side application includes a component specific to the customer system 130. For example, the component may be a stand-alone application, one or more application plug-ins, and/or a browser extension. However, the users may also interact with the customer system 130 via a third-party application, such as a web browser or messaging application, that resides on the client devices 110 and 120 and is configured to communicate with the customer system 130. In either case, the client-side application presents a user interface (UI) for the user to interact with the customer system 130. For example, the user interacts with the customer system 130 via a client-side application integrated with the file system or via a webpage displayed using a web browser application.

A customer system 130 is one or more computing devices associated with a customer to provide functionality of the customer. For example, the customer system 130 may provide an online service. The online service may be any type, such as a banking service, travel service, retail service, and so forth. The customer system 130, however, does not have to provide an online service that is accessible to users. That is, the customer system 130 may simply be a computing system used by a customer to perform any type of functionality.

A customer may use a customer system 130 to cause transmission of messages, such as SMS messages, rich communication service (RCS) messages, and the like. For example, a customer system 130 may provide online functionality that enables users of the customer system 130 to transmit messages to agents of the customer and/or other users. As another example, the customer system 130 may transmit messages to users to provide the users with two-factor authentication, password resets, updates, links to content, promotions, or any suitable combination thereof.

A service provider 140 provides message delivery functionality, which can be utilized by a customer. For example, a service provider 140 charges a customer a fee for each message of the customer that is delivered by the service provider 140. The system 100 may include any number of service providers 140. Different service providers 140 may deliver messages using different channels. For example, one service provider 140 may deliver messages using SMS, another service provider 140 may deliver messages using voicemail, a third service provider 140 may deliver messages using email, and a fourth service provider 140 may deliver messages using a proprietary application. Some service providers 140 may have the capability of delivering messages using multiple channels and may charge the same fee for delivery regardless of channel or may have different fees for different channels. A customer initially creates a relationship with a service provider 140 to deliver messages for the customer. For example, a customer may enter into an agreement with a service provider 140 that provides the best price, quality of service, and/or channel preference based on the needs of the customer. These factors, however, may change over time. For example, the needs of the customer may change and/or the price, channels, and quality of service provided by the service providers 140 may change. This may be problematic as a different service provider 140 may become a better fit for a customer.

To alleviate this issue, the message exchange system 150 selects a service provider 140 to deliver each individual message or a group of messages requested by a customer.

For example, the message exchange system 150 selects a service provider 140 based on customer criteria provided by the customer, bids and channels provided by the service providers 140, and/or performance of the service providers 140. Selecting a service provider 140 per message provides customers with the ability to use multiple service providers 140 and have their messages delivered by the service provider 140 that is best suited to deliver the specific message. For example, the message exchange system 150 may select the service provider 140 that provides the best combination of quality of service, channel, and/or price given the specific needs of the customer. The message exchange system 150 also provides service providers 140 with an opportunity to increase the number of messages they deliver for customers by modifying their bid, channels, and/or quality of service. For example, a service provider 140 may lower their bid, add a channel, and/or increase their quality of service in an effort to increase their chances of being selected to deliver messages.

When a customer requests a group of messages to be delivered, the number of messages in the group may be used as a factor in determining the bids of the service providers 140. For example, a service provider 140 may provide a 10% discount per message when at least 1,000 messages are contained in a single group. Thus, the message exchange system 150 applies the correct rate for each service provider 140 based on the number of messages in the group.

Performance testing data describes the tested performance of the service providers 140. That is, the performance testing data describes performance of test or synthetic messages transmitted by the service providers 140. For example, testing system 170 runs tests of the service providers' 140 networks during which test and/or synthetic messages are transmitted using various routes provided by the service providers 140. The testing system 170 tracks performance of the test messages, such as whether the test messages were transmitted, received and/or resulted in a specified response, the elapsed time for the test messages to be transmitted and/or received, or any suitable combination thereof. The testing system 170 generates performance testing data based on the tracked performance of the tests and provides the generated performance testing data to the message exchange system 150.

Figure 2:
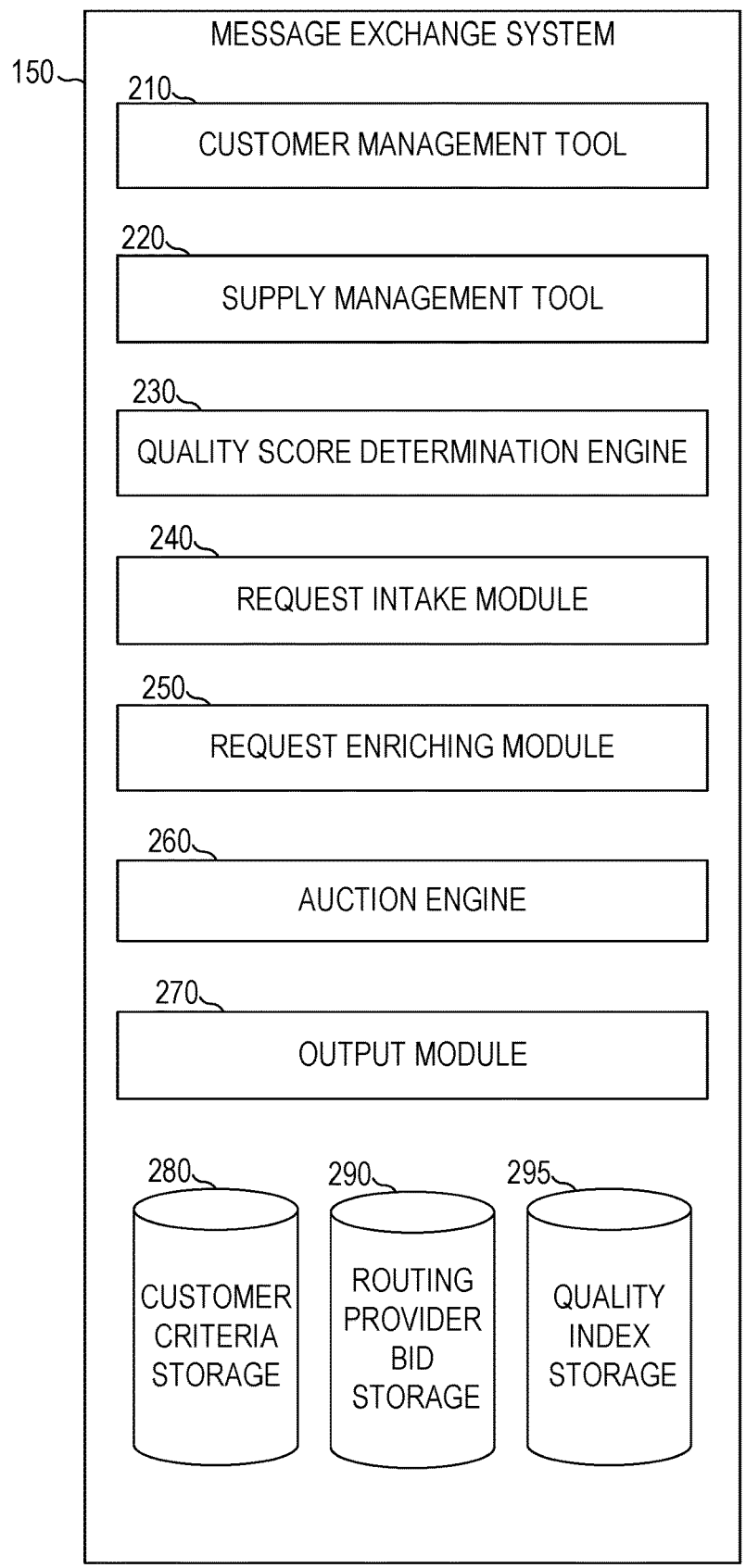
FIG. 2 is a system diagram of a message exchange system, according to some example embodiments.

FIG. 2 is a system diagram of a message exchange system 150, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the message exchange system 150 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the message exchange system 150 includes a customer management tool 210, a supply management tool 220, a quality score determination engine 230, a request intake module 240, a request enriching module 250, an auction engine 260, an output module 270, a customer criteria storage 280, a service provider bid storage 290, and a quality index storage 295.

The customer management tool 210 enables a customer to manage their customer criteria. For example, the customer management tool 210 provides an interface that enables a customer to establish and modify the customer criteria used by the message exchange system 150 to select service providers 140 to deliver messages for the customer.

An administrator or other authorized user of the customer may use a client device 110 to communicate with the message exchange system 150 and utilize the functionality provided by the customer management tool 210. For example, the interface provided by the customer management tool 210 may be presented on a display of the client device 110 and used by the administrator or other authorized user to configure the customer criteria for the customer.

The customer criteria may include data describing preferences of the customer for delivery of messages requested by the customer. For example, the customer criteria may indicate a minimum level of service (e.g., deliverability, latency, or both), maximum cost to deliver a message, ordered preference of channels, preference between cost and quality, or any suitable combination thereof. The customer criteria may define different criteria based on message type, recipient, geographic region, channel, or any suitable combination thereof. For example, a customer may wish to place a higher priority on quality of service for certain types of messages, such as marketing messages or two-way messages, and place a higher priority on price for other types of messages, such as password reset messages or reminders. Similarly, a customer may wish to place a higher priority on quality of service for messages transmitted within specified geographic regions, such as geographic regions that have relatively unreliable service, and a higher priority on price for messages transmitted within other specified geographic regions, such as geographic regions that have relatively reliable service. As another example, a customer may be willing to pay a premium for a preferred channel (e.g., SMS messages) but accept another channel if the cost savings is substantial enough (e.g., to accept email as a substitute if the cost is less than half the cost of an SMS message).

The customer criteria may also define an allowed list of service providers from which the message exchange system 150 may select service providers 140 to deliver messages for the customer. Alternatively, the customer criteria may define a blocked list of service providers that the message exchange system 150 is not to use when selecting a service provider 140 to deliver messages for the customer. The blocked list and/or allowed list may be defined per message type, geographic region, channel, or any suitable combination thereof.

These are just some examples of the customer criteria that may be provided by a customer and is not meant to be limiting. The message exchange system 150 may allow a customer to provide any of a variety of types of customer criteria to dictate selection of a service provider 140.

The customer management tool 210 stores the provided customer criteria in the customer criteria storage 280, where it may be accessed by other modules of the message exchange system 150. The customer criteria stored in the customer criteria storage 280 may be associated with data identifying the customer that provided the customer criteria. For example, the customer criteria may be associated with a unique identifier allocated to the customer and/or an account of the customer with the message exchange system 150.

The supply management tool 220 enables service providers 140 to establish and modify bids for delivering messages. For example, the supply management tool 220 provides an interface that allows service providers 140 to establish and/or modify bids used by the message exchange system 150 when selecting service providers 140 to deliver messages.

An administrator or other authorized user of a service provider 140 may use a client device 110 to communicate with the message exchange system 150 and utilize the functionality provided by the supply management tool 220. For example, the interface provided by the supply management tool 220 may be presented on a display of the client device 110 and used by the administrator or other authorized user to provide and/or modify the bid for the service provider.

A bid provided by a service provider 140 may include a cost value indicating a monetary value that the service provider is willing to accept as payment in exchange for delivering a message. For example, the monetary value may indicate the minimum monetary value that service provider is willing to accept as payment in exchange for delivering a message. The service provider 140 may provide multiple bids with different cost values based on specified criteria, such as the geographic region in which the message is being delivered, the service level provided by the service provider 140 to deliver the message, the type of customer, the channel on which the message is delivered, or any suitable combination thereof. A service provider 140 may provide various service levels, such as a high service level and a standard service level. The high service level may provide a higher likelihood of a message being successfully received by its recipient and/or a shorter time for the message to be received its recipient than the standard service level. Accordingly, the service provider 140 may provide a separate bid and associated cost value for delivering a message with each service level. For example, the cost value to deliver a message with the high service level may be higher than the cost value to deliver a message with the standard service level.

As another example, a service provider 140 may provide separate bids based on geographic region. Accordingly, a service provider 140 may provide a bid with a lower cost value for a route delivering to a geographic region in which the service provider 140 delivers a high volume of messages and/or has a lower operating cost. Alternatively, a service provider 140 may provide a bid with a higher cost value to deliver messages to a geographic region in which the service provider 140 delivers a low volume of messages and/or has a higher operating cost.

A service provider 140 may also provide various bids based on the type of customer or specific customer. A service provider 140 wishing to increase the number of messages they deliver for a specified customer or certain type of customer, such as a customer that delivers a high volume of messages or a customer providing a certain type of service, may provide different bids for the specific customer and/or type of customer. The bid may include a lower cost value than generally offered by the service provider 140 for a given service level, which may increase the frequency at which the service provider 140 is selected to deliver messages for the specific customer and/or type of customer. Each bid provided by a service provider 140 may also define an allowed list and/or blocked list of customers for which the bid may or may not be offered.

As another example, a service provider 140 may provide separate bids based on channel. Accordingly, a service provider 140 may provide a bid with a lower cost value for a channel in which the service provider 140 delivers a high volume of messages, has a lower operating cost, or both. Alternatively, a service provider 140 may provide a bid with a higher cost value for a channel in which the service provider 140 delivers a low volume of messages, has a higher operating cost, or both.

These are just some examples of the bids that may be provided by a service provider 140 and are not meant to be limiting. The message exchange system 150 may allow a service provider 140 to provide any of a variety of types of bids.

The supply management tool 220 stores the bids in the service provider bid storage 290, where they may be accessed by other modules of the message exchange system 150. The bids stored in the service provider bid storage 290 may be associated with data identifying the service provider 140 that provided the customer criteria. For example, the bids may be associated with a unique identifier allocated to the service provider 140 and/or an account of the service provider 140 with the message exchange system 150.

The quality score determination engine 230 generates and maintains a quality index that describes the quality of service provided by each service provider 140. For example, the quality index includes individual quality scores determined for each service provider 140, route provided by each service provider 140, service level provided by each service provider 140, channel served by each service provider 140, or any suitable combination thereof. The quality score indicates a likelihood that a message delivered using the service provider 140, channel, and/or specified route will successfully be delivered to its intended recipient.

The quality score determination engine 230 calculates each quality score based on feedback data and/or performance testing data for each service provider 140. The feedback data is data describing the actual performance of the service provider 140 in delivering messages that have been allocated to the service provider 140 for delivery. For example, the feedback data includes data describing whether the service provider 140 transmitted the messages to their intended recipients, whether the messages were successfully received by their intended recipients, whether the messages resulted in a specified action by the recipients, an amount of time that elapsed until the messages were transmitted by the service provider, an amount of time that elapsed until the messages were received by the recipients, or any suitable combination thereof.

The performance testing data describes the tested performance of the service providers 140. For example, tests of the service provider 140 networks are conducted by the testing system 170 during which test messages are transmitted using routes and channels provided by the service provider 140. The performance testing data describes the tracked performance of the test messages, such as whether the test messages were transmitted, received and/or resulted in a specified response, the elapsed time for the test messages to be transmitted and/or received, or any suitable combination thereof.

The quality score determination engine 230 calculates a quality score for each service provider 140, route provided by each service provider 140, channel provided by each service provider 140, service level provided by each service provider 140, or any suitable combination thereof, based on feedback data and/or performance testing data for the service provider 140. The resulting quality scores indicate the performance level of the service provider 140, route, channel, or service level, such as the likelihood that the message will be successfully received by its intended recipient.

The quality score determination engine 230 stores the quality index including the individual quality scores in the quality index storage 295. Each quality score may be associated with a unique identifier identifying its corresponding service provider 140, route, channel, and/or service level provided by the service provider 140. The quality score determination engine 230 may update the quality scores in the quality index periodically to reflect the current performance level of each service provider 140.

The request intake module 240 receives requests to deliver a message for a customer. For example, the request intake module 240 may receive the request from a customer system 130. The request may be transmitted as a result of a user utilizing the online functionality provided by the customer system 130. For example, a user may use a client device 110 to communicate with and utilize the functionality of the customer system 130, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer system 130 to provide functionality that is not in direct response to a user use of an online service. For example, the request may be transmitted by the customer system 130 to provide promotional materials or updates to users.

The request may include data identifying the customer, data identifying the intended recipient, and/or a payload of the message. For example, the request may include a unique identifier assigned to the customer and/or the customer's account with the message exchange system 150. The request may also include an identifier for the recipient of the message, such as a phone number associated with a recipient client device 110, an account of the message exchange system 150 associated with the recipient, or any suitable combination thereof. The payload may include text, image, a rich media format of data and/or any combination of data formats but not limited to the above formats to be included in the message provided to the recipient.

The request enriching module 250 enriches each received request with the appropriate customer criteria. For example, the request enriching module 250 identifies the customer that transmitted the request based on the unique identifier or other data included in the request, and then searches the customer criteria storage 280 for the customer criteria associated with the identified customer. The request enriching module 250 appends at least a portion of the customer criteria to the received request, resulting in an enriched request. For example, the enriched request may be appended with data identify a minimum level of service, a maximum price the customer is willing to be charged per message, an allowed list and/or blocked list of service providers 140, an importance of cost versus quality of service, an allowed list and/or blocked list of channels, or any suitable combination thereof. The request enriching module 250 may enrich the request with a subset of the customer criteria that is relevant to the message. For example, a customer may define varying customer criteria (e.g., maximum cost, minimum level or service, etc.) based on the type of message (e.g., two communication, password reset, etc.), the geographic region associated with the message, and/or acceptable channels for delivering the message. Accordingly, the request enriching module 250 may identify the customer criteria that relates to the message based on the message type, channel, and/or geographic region, and then append the identified customer criteria to the request. The request enriching module 250 provides the enriched request to the auction engine 260. The request enriching module 250 may provide the enriched request to the auction engine 260 through use of an Application Programming Interface (API) provided for communication with the auction engine 260. For example, the request enriching module 250 may use an API command defined by the API to transmit the enriched request to the auction engine 260.

The auction engine 260 selects a service provider 140 to deliver the message based on the customer criteria appended to the enriched message, as well as the bids provided by the service providers 140 and the quality index. For example, the auction engine 260 communicates with the service provider bid storage 290 to gather the bids provided by the service providers 140. The communication between the auction engine 260 and the service provider bid storage may also be facilitated through use of the API commands. For example, the API provided for communication with the auction engine 260 may include commands to provide bids to the auction engine 260.

The auction engine 260 may gather all bids stored in the service provider bid storage 290 or a subset of the bids stored in the service provider bid storage 290. For example, the auction engine 260 may use an allowed list and/or blocked list included in the customer criteria to select a subset of the bids that are eligible for selection. As another example, the auction engine 260 may select a subset of the bids that fall within criteria specified by the customer criteria, such as the bids associated with a cost value within a given range and/or that provide a specified level of service. The auction engine 260 also communicates with the quality index storage 295 to gather the quality scores associated with each gathered bid.

The auction engine 260 ranks each of the bids based on the customer criteria, the quality scores, and/or the cost values associated with the bids. For example, the auction engine 260 calculates a ranking value for each bid based on a combination of the customer criteria, the quality scores, the channels, and/or the cost values associated with the bids and then ranks the bids based on the resulting ranking values.

In some embodiments, the auction engine 260 calculates the ranking value for each bid based on just the quality score associated with the bid and the cost value of the bid. For example, the auction engine 260 may calculate the ranking score by multiplying or computing a function of the cost value to the quality score.

In other embodiments, however, the auction engine 260 calculates the ranking value for each bid based on the quality score associated with the bid, the cost value of the bid, the channel of the bid, and the customer criteria. For example, the auction engine 260 may apply a weight to the quality scores and/or cost values based on the customer criteria and the channel and then calculate the ranking values based on the weighted quality scores and/or cost values. The customer criteria may indicate a customer's selected level of importance in relation to the cost, channel, and/or level of service provide by a service provider 140.

The auction engine 260 may apply weights to the quality scores and/or cost values based on the level of importance selected by the customer as indicated in the customer criteria. The auction engine 260 may apply a weight reducing the impact of the quality score when the customer criteria indicates that the cost provided by a service provider 140 is of greater importance to the customer than the quality of service provided by the service provider 140. For example, the auction engine 260 may reduce the impact of the quality score by multiplying the quality score by a weight value that is less than 1. Alternatively, the auction engine 260 may apply a weight increasing the impact of the quality score when the customer criteria indicates that the quality of service provided by the service provider 140 is of greater importance to the customer than the cost provided by the service provider 140. For example, the auction engine 260 may increase the impact of the quality score by multiplying the cost value by a weight value that is greater than 1.

Similarly, the auction engine 260 may apply a weight reducing the impact of the cost value when the customer criteria indicates that the quality of service provided by a service provider 140 is of greater importance to the customer than the cost provided by the service provider 140. For example, the auction engine 260 may reduce the impact of the cost value by multiplying the cost value by a weight value that is less than 1. Alternatively, the auction engine 260 may apply a weight increasing the impact of the cost value when the customer criteria indicates that the cost provided by the service provider 140 is of greater importance to the customer than the quality of service provided by the service provider 140. For example, the auction engine 260 may increase the impact of the cost value by multiplying the cost value by a weight value that is greater than 1.

The auction engine 260 may apply a weight to one or both of the cost value and quality score, resulting in a weighted cost value and/or weighted quality score. The auction engine 260 may then calculate the ranking value for each bid based on the weighted cost value and/or weighted quality score. For example, the auction engine 260 may multiply the weighted cost value by the weighted quality score, resulting in the ranking value. As another example, the auction engine 260 may multiply the weighted cost value by the quality score (e.g., quality score without a weight applied), resulting in the ranking value.

The auction engine 260 ranks each of the bids based on the ranking values. For example, the auction engine 260 ranks the bids from the bid with the highest ranking value to the bid with the lowest ranking value, or vice versa. The auction engine 260 then selects a bid based on the resulting ranking. For example, the auction engine 260 selects the bid that is ranked the highest. Alternatively, in some embodiments, the auction engine 260 selects a bid that is ranked within a specified range, such as one of bids that is ranked in the top 5.

The auction engine 260 also selects a final cost value for delivering the message via the selected service provider. For example, the auction engine 260 may simply select the cost value associated with the selected bid as the final cost value. As a result, the customer will be charged the cost value of the selected bid for delivery of the message. As another example, the auction engine 260 may select the cost value associated with another bid, such as the second highest ranked bid. Accordingly, the customer will be charged the cost value of the second ranked bid for delivery of the message, even though the second bid was not selected for delivering the message.

The auction engine 260 provides data identifying the selected bid to the output module 270. The output module 270 allocates the message for delivery to the service provider 140 associated with the selected bid. For example, the output module 270 transmits the message to the selected service provider 140 with instructions to deliver the message to the intended recipient client device 110 via the channel indicated in the selected bid. The output module 270 may provide the service provider with data identifying the specific bid selected by the message exchange system 150. This may provide the service provider 140 with data regarding which route, channel, and/or service level to provide for delivering the message.

Figure 3:
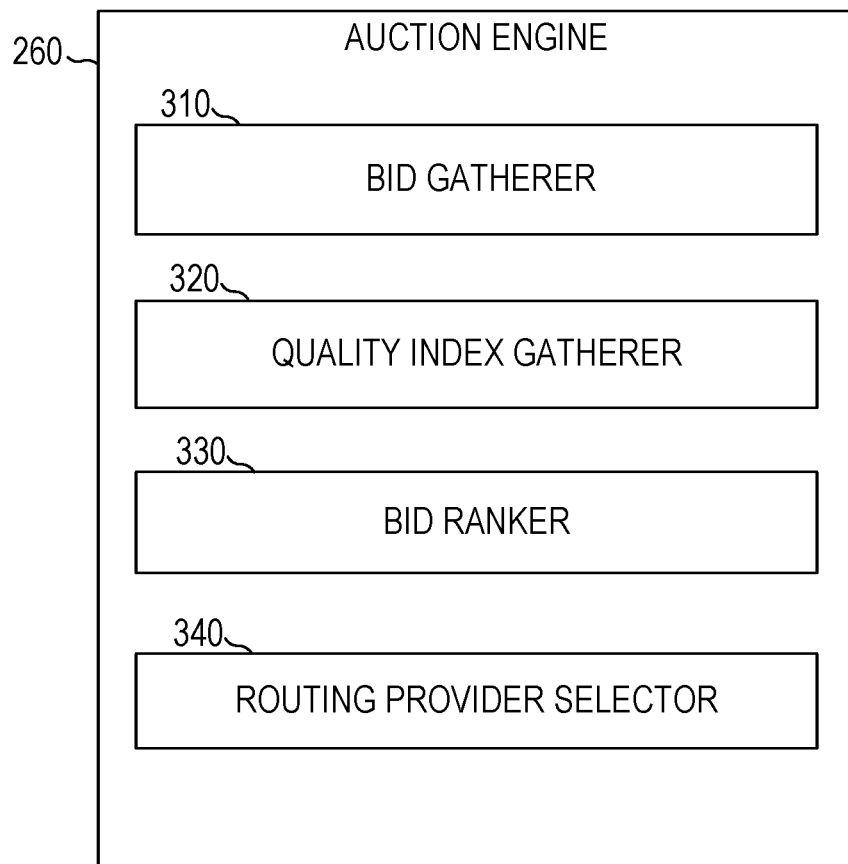
FIG. 3 is a system diagram of an auction engine, according to some example embodiments.

FIG. 3 is a system diagram of an auction engine 260, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the auction engine 260 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the auction engine 260 includes a bid gatherer 310, a quality index gatherer 320, a bid ranker 330, and a service provider selector 340. The bid gatherer 310 gathers bids provided by the service providers 140 for a message request. For example, the bid gatherer 310 communicates with the service provider bid storage 290 to gather the bids provided by the service providers 140. The bid gatherer 310 may gather all of the bids or a subset of the bids stored in the service provider bid storage 290. For example, the bid gatherer 310 may use an allowed list and/or blocked list included in the customer criteria to select a subset of the bids that are eligible for selection. As another example, the bid gatherer 310 may select a subset of the bids that fall within criteria specified by the customer criteria, such as the bids associated with a cost value that is in a range defined by the customer criteria, bids associated with channels defined by the customer criteria, bids associated with a level of service that is in a range defined by the customer criteria, or any suitable combination thereof.

The bid gatherer 310 may also select a subset of bids based on a geographic region associated with the message request. For example, the recipient of the message may be in a specified geographic region. Accordingly, the bid gatherer 310 may select a subset of the bids that provide delivery in the given geographic region.

The quality index gatherer 320 gathers quality scores for the bids. For example, the quality index gatherer 320 communicates with the quality index storage 295 to gather the quality scores. The quality index gatherer 320 may gather the entire quality index or a subset of the quality scores. For example, the quality index gatherer 320 may gather a subset of the quality scores that correspond to the bids gathered by the bid gatherer 310.

The bid ranker 330 ranks each of the bids based on the customer criteria included in the enriched request, the quality scores gathered by the quality index gatherer 320, and/or the cost values associated with the bids gathered by the bid gatherer 310. The bid ranker 330 calculates a ranking value for each bid based on a combination of the customer criteria, the quality scores and/or the cost values associated with the bids and then ranks the bids based on the resulting ranking values.

In some embodiments, the bid ranker 330 calculates the ranking value for each bid based on only the quality score associated with the bid and the cost value of the bid. For example, the bid ranker 330 may calculate the ranking score by multiplying or computing a function of the cost value and the quality score In other embodiments, however, the bid ranker 330 calculates the ranking value for each bid based on the quality score associated with the bid, the cost value of the bid, and the customer criteria. For example, bid ranker 330 may apply a weight to the quality scores and/or cost values based on the customer criteria and then calculate the ranking values based on the weighted quality scores and/or cost values. The bid ranker 330 may apply a weight to one or both of the cost value and quality score, resulting in a weighted cost value and/or weighted quality score. The bid ranker 330 then calculates the ranking value for each bid based on the weighted cost value and/or weighted quality score. For example, the bid ranker 330 may multiply the weighted cost value by the weighted quality score, resulting in the ranking value. As another example, the bid ranker 330 may multiply the weighted cost value by the quality score (e.g., quality score without a weight applied), resulting in the ranking value.

The bid ranker 330 ranks each of the bids based on the ranking values. For example, the bid ranker 330 ranks the bids from the bid with the highest ranking value to the bid with the lowest ranking value, or vice versa.

The service provider selector 340 selects a bid for the message based on the ranking generated by the bid ranker 330. For example, the service provider selector 340 selects the bid that is ranked the highest. The service provider selector 340 also selects a final cost value for delivering the message via the selected bid. For example, the service provider selector 340 may select the cost value associated with the selected bid or the cost value associated with another bid, such as the second highest ranked bid. The service provider selector 340 provides data identifying the selected bid to the output module 270.

Figure 4:
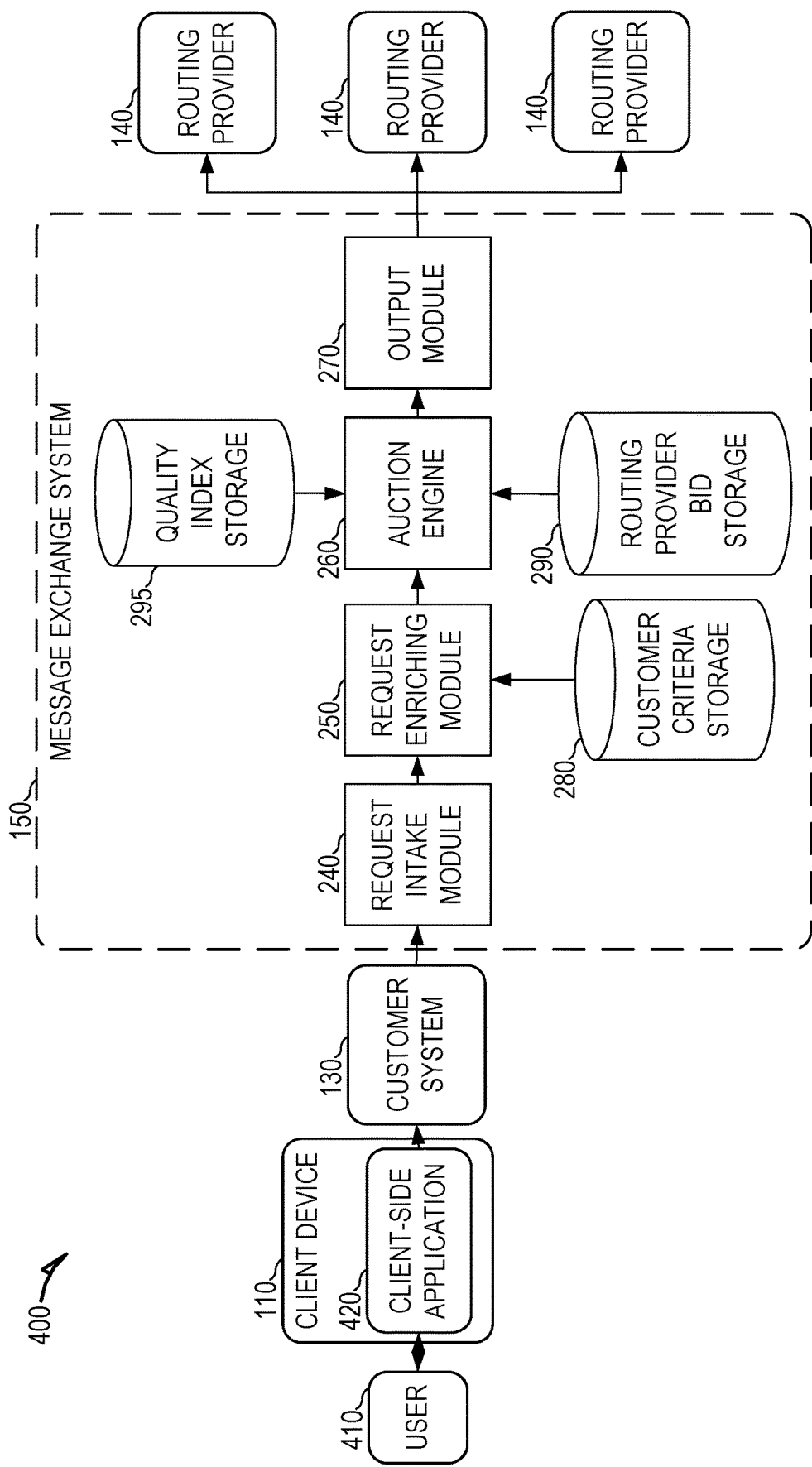
FIG. 4 shows communications within a system for selecting a service provider to deliver a message based on customer criteria, according to some example embodiments.

FIG. 4 shows communications within a system 400 for selecting a service provider to deliver a message based on customer criteria, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 4. However, a skilled artisan will readily recognize that various additional functional components may be supported by the system 400 to facilitate additional functionality that is not specifically described herein. Furthermore, the various functional components depicted in FIG. 4 may reside on a single computing device or may be distributed across several computing devices in various arrangements such as those used in cloud-based architectures.

As shown, a user 410 uses a client-side application 420 installed on a client device 110 to utilize the functionality of a customer system 130. The customer system 130 may transmit messages as part of its provided services. For example, the customer system 130 may allow the user 410 to transmit messages to an agent of the customer, transmit messages to other users 410, request a message be transmitted to the client device 110 to provide information, reset a password, or any suitable combination thereof. The customer system 130 may also transmit messages that are not in response to a request made by a user 410. For example, the customer system 130 may transmit messages to provide a user 410 with a notification, marketing materials, request identify confirmation, or any suitable combination thereof.

The customer utilizes the functionality of the message exchange system 150 for delivering messages. For example, the message exchange system 150 selects a service provider 140 to deliver each message based on customer criteria provided by the customer, bids provided by the service providers 140, channels used by the service providers 140, a quality index describing the quality of service provided by the service providers 140, or any suitable combination thereof. This allows the customer to utilize the service provider 140 best suited to deliver the message based on the needs of the customer.

The customer system 130 transmits a request to the message exchange system 150 to transmit a message. The request includes data identifying the customer and the recipient of the message. For example, the request may include a unique identifier associated with the customer and/or the customer's account of the message exchange system 150. The request is received by the request intake module 240 of the message exchange system 150.

The request intake module 240 provides the received request to the request enriching module 250, which enriches the request with the customer criteria provided by the customer. The request enriching module 250 uses the unique identifier or other data included in the request to identify the customer that transmitted the request. The request enriching module 250 then communicates with the customer criteria storage 280 to gather the customer criteria associated with the customer.

The request enriching module 250 appends at least a portion of the customer criteria to the received request, resulting in an enriched request. For example, the enriched request may be appended with data identifying a minimum level of service, a maximum price, an allowed list and/or blocked list of service providers 140, an importance of cost versus quality of service, an allowed list and/or blocked list of channels, or any suitable combination thereof. The request enriching module 250 provides the enriched request to the auction engine 260.

The auction engine 260 selects a service provider 140 to deliver the message based on the customer criteria appended to the enriched message, as well as the bids provided by the service providers 140, the channels supported by the service providers 140, the quality index of the service providers 140, or any suitable combination thereof. For example, the auction engine 260 communicates with the service provider bid storage 290 to gather the bids provided by the service providers 140. The auction engine 260 may gather all of the bids or a subset of the bids provided by the service providers 140. For example, the auction engine 260 may use an allowed list and/or blocked list included in the customer criteria to select a subset of the bids that are eligible for selection. As another example, the auction engine 260 may select a subset of the bids that fall within criteria specified by the customer criteria, such as the bids associated with a cost value within a given range, with channels preferred by the customer, and/or that provide a specified level of service. The auction engine 260 also communicates with the quality index storage 295 to gather the quality scores associated with each gathered bid.

The auction engine 260 ranks each of the bids based on the customer criteria, the quality scores, the channels, and/or the cost values associated with the bids. For example, the auction engine 260 calculates a ranking value for each bid based on a combination of the customer criteria, the quality scores, the channels, and/or the cost values associated with the bids and then ranks the bids based on the resulting ranking values.

In some embodiments, the auction engine 260 calculates the ranking value for each bid based on the quality score associated with the bid and the cost value of the bid. For example, the auction engine 260 may calculate the ranking score by multiplying or adding the cost value to the quality score.

In other embodiments, the auction engine 260 calculates the ranking value for each bid based on the quality score associated with the bid, the cost value of the bid, and the customer criteria. For example, the auction engine 260 may apply a weight to the quality scores and/or cost values based on the customer criteria and then calculate the ranking values based on the weighted quality scores and/or cost values. The customer criteria may indicate a level of importance selected by the customer in relation to the cost, channel, and/or level of service provide by a service provider 140.

The auction engine 260 may apply weights to the quality scores and/or cost values based on the level of importance selected by the customer as indicated in the customer criteria. The auction engine 260 may apply a weight reducing the impact of the quality score when the customer criteria indicates that the cost provided by a service provider 140 is of greater importance to the customer than the level of quality provided by the service provider 140. For example, the auction engine 260 may reduce the impact of the quality score by multiplying the quality score by a weight value that is less than 1. Alternatively, the auction engine 260 may apply a weight increasing the impact of the quality score when the customer criteria indicates that the level of quality provided by the service provider 140 is of greater importance to the customer than the cost provided by the service provider 140. For example, the auction engine 260 may increase the impact of the quality score by multiplying the cost value by a weight value that is greater than 1.

Similarly, the auction engine 260 may apply a weight reducing the impact of the cost value when the customer criteria indicates that the level of service provided by a service provider 140 is of greater importance to the customer than the cost provided by the service provider 140. For example, the auction engine 260 may reduce the impact of the cost value by multiplying the cost value by a weight value that is less than 1. Alternatively, the auction engine 260 may apply a weight increasing the impact of the cost value when the customer criteria indicates that the cost provided by the service provider 140 is of greater importance to the customer than the level of service provided by the service provider 140. For example, the auction engine 260 may increase the impact of the cost value by multiplying the cost value by a weight value that is greater than 1.

The auction engine 260 may apply a weight to one or both of the cost value and quality score, resulting in a weighted cost value and/or weighted quality score. The auction engine 260 may then calculate the ranking value for each bid based on the weighted cost value and/or weighted quality score. For example, the auction engine 260 may multiply the weighted cost value by the weighted quality score, resulting in the ranking value. As another example, the auction engine 260 may multiply the weighted cost value by the quality score (e.g., quality score without a weight applied), resulting in the ranking value.

The auction engine 260 ranks each of the bids based on the ranking values. For example, the auction engine 260 ranks the bids from the bid with the highest ranking value to the bid with the lowest ranking value, or vice versa. The auction engine 260 then selects a bid based on the ranking. For example, the auction engine 260 selects the bid that is ranked the highest.

The auction engine 260 also selects a final cost value for delivering the message via the selected bid. For example, the auction engine 260 may simply select the cost value associated with the selected bid as the final cost value. As a result, the customer will be charged the cost value of the selected bid for delivery of the message.

In some example embodiments, the auction engine 260 selects the cost value associated with another bid, such as the second highest ranked bid. Accordingly, the customer will be charged the cost value of the second-ranked bid for delivery of the message, even though the second bid was not selected by the auction engine 260 for delivering the message. In these embodiments, the second-ranked bid likely has a higher rate for delivering the same message than the first-ranked bid. The customer pays the higher rate, but the message is delivered by the service provider 140 with the best bid. As a result, the service providers 140 are incentivized to provide lower bids, knowing that there is a chance that they will win the work and be paid more than their bid.

The auction engine 260 provides data identifying the selected bid to the output module 270. The output module 270 allocates the message to the service provider 140 associated with the selected bid. For example, the output module 270 transmits the message to the corresponding service provider 140, which in turn delivers the message to its intended recipient.

FIG. 5 is a block diagram of an example database schema 500, suitable for selecting a service provider to deliver a message based on customer criteria. The database schema 500 includes a criteria table 510, a bid table 540, and a quality table 570. The criteria table 510 includes rows 530A, 530B, 530C, and 530D of a format 520. The bid table 540 includes rows 560A, 560B, 560C, and 560D of a format 550. The quality table 570 includes rows 590A, 590B, 590C, and 590D of a format 580.

Each row of the criteria table 510 stores criteria for one or more channels for an account. The row 530A indicates that account 1 is willing to pay up to $0.006 per SMS message as long as the message is sent with a minimum quality score of 4. For SMS messages, account 1 gives price a weight of 1.2 when scoring bids. The row 530B indicates that account 1 is willing to pay up to $0.004 per email message sent with a minimum quality score of 3. For email messages, account 1 gives price a weight of 1 when scoring bids. The row 530C indicates that account 1 is willing to pay up to $0.005 per voicemail message sent with a minimum quality score of 5. For voicemail messages, account 1 gives price a weight of 0.6 when scoring bids. By combining the criteria in the rows 530A-530C, the message exchange system 150 is enabled to select between providers of SMS, email, and voicemail messaging services to deliver messages for account 1.

Additionally, each row of the criteria table 510 indicates a channel weight for bids of the channel of the row for the account of the row. Thus, for account 1, SMS has a channel weight of 1, email has a channel weight of 1.2, and voicemail has channel weight of 0.8, indicating a preference of account 1 for email over SMS and SMS over voicemail.

The row 530D indicates that account 2 is willing to accept delivery using any channel, paying up to $0.100 per message, but requires a minimum quality score of 5 and uses a price weight of 1.

Rows 560A and 560B of the bid table 540 indicate that provider 1 delivers SMS messages to the USA region using two different routes. For route 1, provider 1 charges $0.005 per message. For route 2, provider 1 charges $0.003 per message.

Rows 560C and 560D of the bid table 540 indicate that provider 2 delivers voicemail messages to the USA region using route 3 for $0.003 per message and MMS messages to any region using route 3 for $0.010 per message.

The quality table 570 may be cross-referenced with the bid table 540 to determine a quality score for each provider/route/channel triplet. For example, the row 590A shows that the quality score for provider 1 on route 1 is 10 and the quality score for provider 1 on route 2 is 8. Thus, the lower bid of $0.003 per SMS using route 2 (compared to $0.005 per SMS using route 1) is counter-balanced by the lower quality of route 2. The rows 590C and 590D show that provider 2 has a quality score of 6 for voicemails on route 3, but only a quality score of 4 for MMS messages on the same route.

Figure 6:
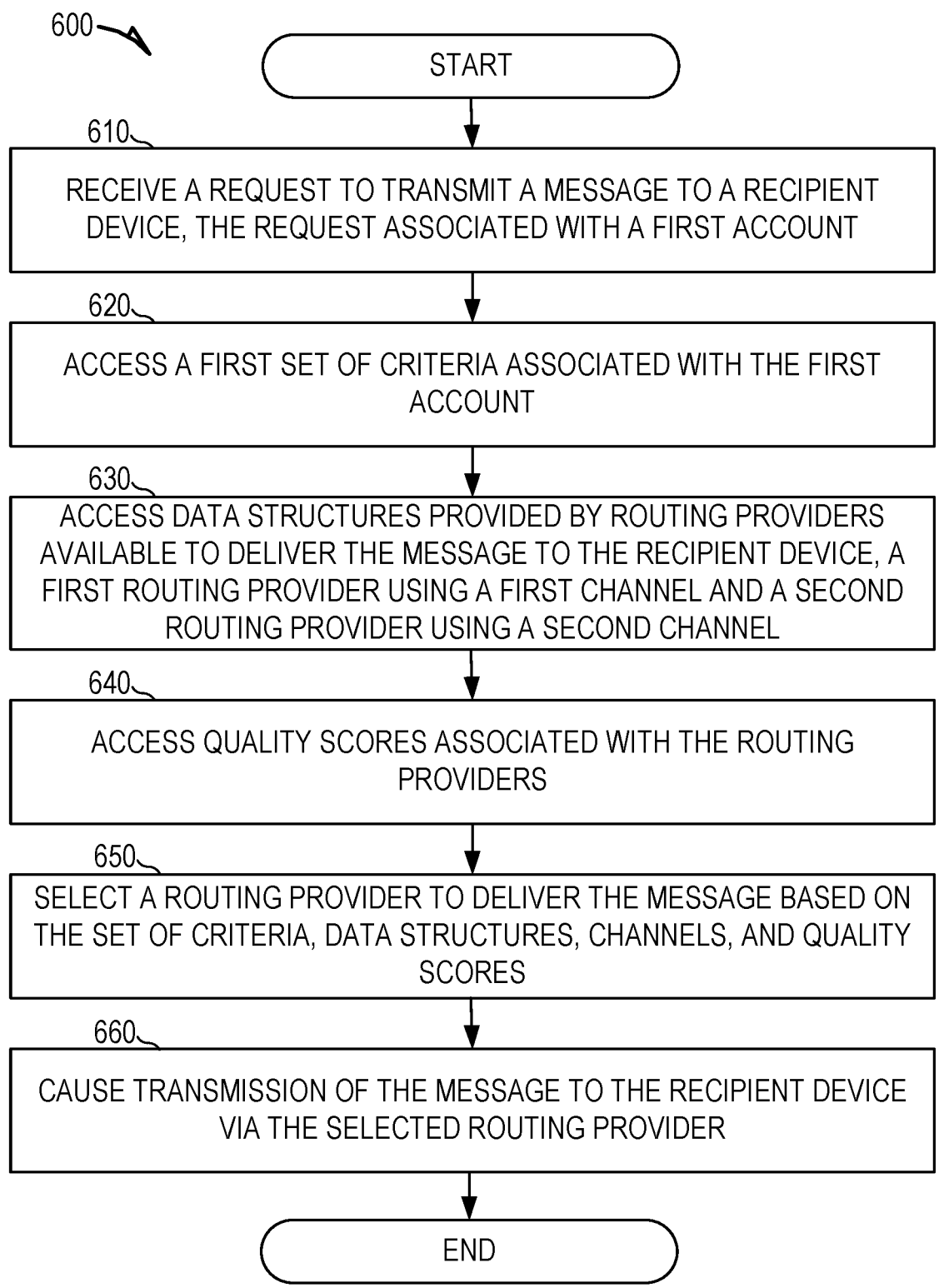
FIG. 6 is a flowchart showing a method for transmitting a message via a service provider selected based on customer criteria, according to some example embodiments.

FIG. 6 is a flowchart showing a method 600 for transmitting a message via a service provider 140 selected based on customer criteria, according to some example embodiments. The method 600 may be embodied in computer readable instructions for execution by one or more processors such that the operations of the method 600 may be performed in part or in whole by the message exchange system 150; accordingly, the method 600 is described below by way of example with reference thereto. However, it shall be appreciated that at least some of the operations of the method 600 may be deployed on various other hardware configurations and the method 600 is not intended to be limited to the message exchange system 150.

In operation 610, the request intake module 240 receives a request to transmit a message to a recipient device. For example, the request intake module 240 may receive the request from a customer system 130. The request may be transmitted as a result of a user utilizing the online functionality provided by the customer system 130. For example, a user may use a client device 110 to communicate with and utilize the functionality of the customer system 130, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer system 130 to provide functionality that is not in direct response to a user use of an online service. For example, the request may be transmitted by the customer system 130 to provide promotional materials or updates to users.

The request may include data identifying the customer, data identifying the intended recipient, channel data, a payload of the message, or any suitable combination thereof. For example, the request may include a unique identifier assigned to the customer and/or the customer's account with the message exchange system 150. The request may also include an identifier for the recipient of the message, such as a phone number associated with a recipient client device 110, an account of the message exchange system 150 associated with the recipient, or both. The payload may include text, image, a rich media format of data and/or any combination of data formats but not limited to the above formats to be included in the message provided to the recipient. The request may identify a single channel to be used to send the message, an allowed list of channels that may be used for the message, a blocked list of channels that may not be used for the message, or any suitable combination thereof.

The request enriching module 250, in operation 620, accesses a set of criteria for an account associated with the request. For example, the request enriching module 250 identifies the customer that transmitted the request based on the unique identifier or other data included in the request, and then searches the customer criteria storage 280 for the customer criteria associated with the identified customer. The request enriching module 250 appends at least a portion of the customer criteria to the received request, resulting in an enriched request. For example, the enriched request may be appended with data identifying a minimum level of service, a maximum price the customer is willing to be charged per message, an allowed list and/or blocked list of service providers 140, an importance of cost versus quality of service, an allowed list and/or blocked list of channels, or any suitable combination thereof. The request enriching module 250 may enrich the request with a subset of the customer criteria that is relevant to the message. For example, a customer may define varying customer criteria (e.g., maximum cost, minimum level or service, preferred channel, and the like) based on the type of message (e.g., two-factor authentication, password reset, and the like) and/or the geographic region associated with the message. Accordingly, the request enriching module 250 may identify the customer criteria that relates to the message based on the message type and/or geographic region, and then append the identified customer criteria to the request. The request enriching module 250 provides the enriched request to the auction engine 260.

In operation 630, the bid gatherer 310 accesses data structures provided by service providers 140 available to deliver the message to the recipient device, with a first service provider using a first channel (e.g., SMS) and a second service provider using a second channel (e.g., email). For example, the bid gatherer 310 communicates with the service provider bid storage 290 to access the data structures provided by the service providers 140. The bid gatherer 310 may access all of the data structures or a subset of the data structures stored in the service provider bid storage 290. For example, the bid gatherer 310 may use an allowed list and/or blocked list included in the customer criteria to select a subset of the data structures that are eligible for selection. As another example, the bid gatherer 310 may select a subset of the data structures that fall within criteria specified by the customer criteria, such as the data structures associated with a cost value that is below a maximum bid value and/or higher than minimum cost value defined by the customer criteria. As another example, the bid gatherer 310 may select a subset of the data structures that provide a level of service that is greater than a minimum level of service and/or lower than a maximum level of service defined by the customer criteria. As still another example, the bid gatherer 310 may select a subset of the data structures that use channels on an allowed list in the customer criteria, do not use channels on a blocked list in the customer criteria, or both. For example, the user criteria may allow the first channel and the second channel but block a third channel. A data structure of a third service provider using the third channel is not included in the selected subset of data structures.

Data structures (e.g., bids) provided by the service providers 140 may be received in response to a customer request to deliver a particular message or group of messages, asynchronously with respect to the customer requests, or both. The bids of the service providers 140 may be based on availability of computing resources, transmission costs, outages, or any suitable combination thereof. The service providers 140 may be configured (e.g., through an application) to call an application programming interface (API) to provide bids. The service providers 140 may provide an administrative user interface for configuring the bids. The bids may be updated in real-time based on various criteria specified by the service providers being satisfied.

The bid gatherer 310 may also select a subset of bids based on a geographic region associated with the message request. For example, the recipient of the message may be in a specified geographic region. Accordingly, the bid gatherer 310 may select a subset of the bids that provide delivery in the given geographic region.

The quality index gatherer 320 accesses quality scores associated with the service providers 140 (operation 640). For example, the quality index gatherer 320 communicates with the quality index storage 295 to access the quality scores. The quality index gatherer 320 may access the entire quality index or a subset of the quality scores. For example, the quality index gatherer 320 may access a subset of the quality scores that correspond to the bids accessed by the bid gatherer 310.

In operation 650, the auction engine 260 selects a service provider 140 to deliver the message based on the set of criteria, data structures, channels, and quality scores. For example, the auction engine 260 determines ranking values for each data structure based on a combination of the set of criteria, data structures, channels, and quality scores and then selects a service provider 140 based on the ranking. Examples of selecting a service provider 140 and determining the quality scores is described below in relation to FIGS. 7 and 8.

The output module 270, in operation 660, causes transmission of the message to the recipient device via the selected service provider 140. The auction engine 260 provides data identifying the selected bid to the output module 270. The output module 270 allocates the message for delivery to the service provider 140 associated with the selected bid. For example, the output module 270 transmits the message to the selected service provider 140 with instructions to deliver the message to the intended recipient client device 110. The output module 270 may provide the service provider with data identifying the specific bid selected by the message exchange system 150. This may provide the service provider 140 with data regarding which route, channel, and/or service level to provide for delivering the message.

Figure 7:
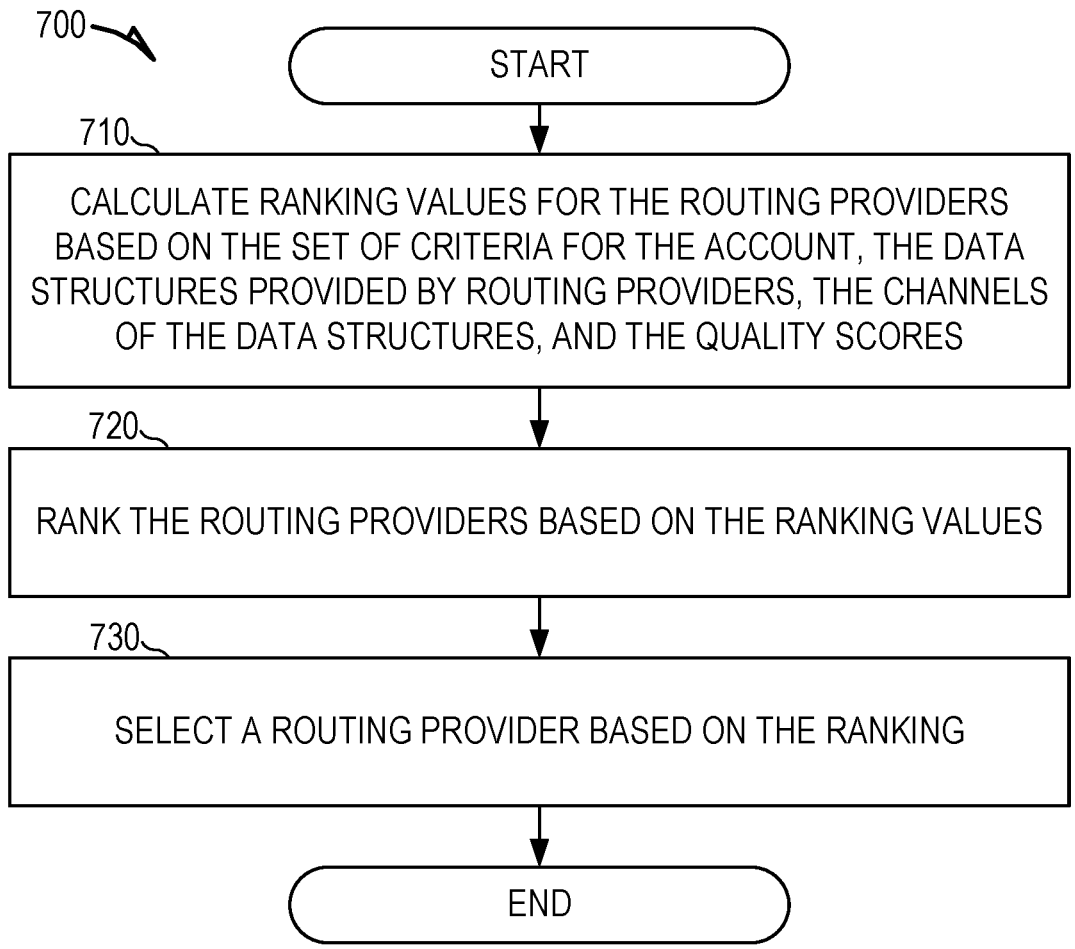
FIG. 7 is a flowchart showing a method for selecting a service provider to deliver a message, according to some example embodiments.

FIG. 7 is a flowchart showing a method 700 for selecting a service provider 140 to deliver a message, according to some example embodiments. The method 700 may be embodied in computer readable instructions for execution by one or more processors such that the operations of the method 700 may be performed in part or in whole by the message exchange system 150; accordingly, the method 700 is described below by way of example with reference thereto. However, it shall be appreciated that at least some of the operations of the method 700 may be deployed on various other hardware configurations and the method 700 is not intended to be limited to the message exchange system 150.

In operation 710, the bid ranker 330 calculates ranking values for the service providers 140 based on the set of criteria for the account, the data structures provided by the service providers 140, the channels of the data structures, and the quality scores. The bid ranker 330 calculates a ranking value for each data structure/service provider based on a combination of the customer criteria, the quality scores, the channels, the cost values associated with the data structures, or any suitable combination thereof. For example, in some embodiments, the bid ranker 330 calculates the ranking value for each data structure based on only the quality score associated with the data structure and the cost value of the data structure, so long as the data structure is for a channel accepted by the set of criteria for the account. For example, the bid ranker 330 may calculate the ranking score by multiplying or computing a function of the cost value and the quality score. In other embodiments, the channel of the data structure results in a multiplier for the ranking score based on the set of criteria for the account. For example, SMS messages may be preferred over email and data structures (e.g., bids) for SMS messages may be given an extra 20% toward their rank (i.e., the ranking value for an SMS message may be multiplied by 1.2 before being considered in operation 720).

The bid ranker 330 may apply a weight to the quality scores and/or cost values based on the customer criteria and then calculate the ranking values based on the weighted quality scores and/or cost values. For example, the customer may select a level of importance indicating the customer's preference of using a service provider 140 that provides high quality (e.g., a high likelihood of successfully delivering a message) to a service provider 140 that offers a low cost. The weight value may be a multiplier indicating the level of importance designated by the customer. For example, the weight value may be a value less than 1 to indicate that the customer places a lower level of importance on the quality provided by the service providers 140. Alternatively, the weight value may be a value greater than 1 to indicate that the customer places a higher level of importance on the quality provided by the service providers 140.

The bid ranker 330, in operation 720, ranks the service providers 140 based on the ranking values. For example, the bid ranker 330 ranks the bids from the bid with the highest-ranking value to the bid with the lowest ranking value, or vice versa.

The service provider selector 340 selects a service provider 140 based on the ranking (operation 730). For example, the service provider selector 340 selects the bid that is ranked the highest. The service provider selector 340 may also select a final cost value for delivering the message via the selected bid. For example, the service provider selector 340 may select the cost value associated with the selected bid or the cost value associated with another bid, such as the second highest ranked bid. The service provider selector 340 provides data identifying the selected bid to the output module 270.

Though many weighting and ranking algorithms are possible, one will be considered as an example. In this example, a price score is determined on a linear scale such that a bid price of zero is given a maximum score of 10 and a bid price of the maximum price offered by the account is given a minimum score of zero. Bids with bid prices greater than the maximum price are not considered and thus need not be scored. Also in this example, the quality score in the quality table 570 is used, with the quality score also having a range of 0-10. To combine the price score and the quality score, the price score is multiplied by the price weight and then the modified price score is added to the quality score.

Continuing with this example and with reference to the criteria table 510, the bid table 540, and the quality table 570 of FIG. 5, the ranking score for delivering a message by SMS using route 1 of provider 1 for account 1 is determined as follows. The price score is $$1.67\left(10 \cdot \frac{\text{Max Price} - \text{Bid Price}}{\text{Max Price}}\right).$$

The quality score is 10. The modified price score is 2.00 (Price Weight·Price Score). The combined score is 12 (Modified Price Score+Quality Score). The ranking score is also 12 (Combined Score·Channel Weight).

Using the same method, the price score for delivering a message by SMS using route 2 of provider 1 for account 1 is 5. The modified price score is 6. The quality score is 8. The combined score is 14 and the ranking score is also 14.

Continuing with this example, the voicemail bid of $0.007 of row 560C has a price score of 4, a modified price score of 2.4, a quality score of 6, a combined score of 8.4, and a ranking score of 6.72. The MMS bid of the row 560D will not be considered for account 1 because account 1 has not included MMS as an acceptable channel (by reference to the rows 530A-530C).

Thus, only three bids are considered for account 1. Since 14 is the highest-ranking score, the bid of the row 560B, to use the less expensive and lower-quality SMS route, will be accepted over the bid of the row 560A, to use the more expensive and higher-quality SMS route, for account 1.

For account 2, the bid of the row 560D is associated with a quality score of 4 (per the row 590D), which is below the minimum quality accepted by account 2 (as shown in the row 530D). Accordingly, no ranking score will be generated for the bid of the row 560D. The maximum price for account 2 is $0.100 and the bid price for each of the bids of the rows 560A-560C is substantially lower than this, so the price scores will be relatively high: 9.5, 9.7, and 9.7, respectively. Thus, the differences in quality scores of the table 570 will dominate the bidding process and the bid of the row 560A will be selected, with a ranking score of 19.5, as compared to 17.7 and 15.7, respectively. Had account 2 been willing to pay a high maximum price but preferred lower price over quality, the same maximum price could have been used with a high price weight. For example, a price weight of 20 would have yielded ranking scores of 200, 204, and 202, resulting in the less expensive route 2 being selected for account 2, as it was for account 1.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: receiving, by one or more processors, a request to transmit a message to a recipient device, the request associated with a first account; accessing a first set of criteria associated with the first account; accessing a first data structure provided by a first service provider, the first data structure indicating a first value for the first service provider to deliver the message to the recipient device via a first channel; accessing a second data structure provided by a second service provider, the second bid indicating a second value for the second service provider to deliver the message to the recipient device via a second channel; accessing a first quality score describing a first likelihood that the message will be received by the recipient device if delivered by the first service provider; accessing a second quality score describing a second likelihood that the message will be received by the recipient device if delivered by the second service provider; selecting the first service provider to deliver the message to the recipient device based on the first set of criteria associated with the first account, the first data structure, the second data structure, the first quality score and the second quality score; and causing the message to be transmitted to the recipient device via the first service provider.

In Example 2, the subject matter of Example 1, wherein the first channel is a short message service (SMS) client.

In Example 3, the subject matter of Examples 1-2, wherein the first channel is email.

In Example 4, the subject matter of Examples 1-3, wherein the first channel is a proprietary channel.

In Example 5, the subject matter of Examples 1-4, wherein the first channel is voicemail.

In Example 6, the subject matter of Examples 1-5, wherein the selecting of the first service provider to deliver the message comprises: calculating a first ranking value for the first data structure based on the first set of criteria, the first value, the first channel, and the first quality score; calculating a second ranking value for the second data structure based on the first set of criteria, the second value, the second channel, and the second quality score; ranking the first data structure and the second data structure based on the first ranking value and the second ranking value; and selecting the first service provider based on the ranking.

In Example 7, the subject matter of Example 6, wherein the calculating of the first ranking value comprises: determining a first weight value based on the first set of criteria; applying the first weight value to the first quality score, yielding a first weighted quality score; and determining the first ranking value based on the first value and the first weighted quality score.

In Example 8, the subject matter of Examples 1-7, wherein the first set of criteria identifies a maximum value.

In Example 9, the subject matter of Example 8 includes determining that the first value and the cost value do not exceed the maximum value identified by the first set of criteria.

In Example 10, the subject matter of Examples 8-9 includes determining that a third value associated with a third data structure exceeds the maximum value identified by the first set of criteria, the third data structure being excluded from a set of data structures gathered for potential selection to deliver the message, the set of data structures gathered for potential selection to deliver the message including the first data structure and the second data structure.

In Example 11, the subject matter of Examples 1-10 includes receiving, via an application programming interface, a modification of the first set of criteria associated with the first account.

In Example 12, the subject matter of Examples 1-11, wherein the request identifies a maximum latency for transmitting the message.

Example 13 is a system comprising: one or more computer processors; and one or more computer-readable mediums storing instructions that, when executed by the one or more computer processors, cause the system to perform operations comprising: receiving a request to transmit a message to a recipient device, the request associated with a first account; accessing a first set of criteria associated with the first account; accessing a first data structure provided by a first service provider, the first data structure indicating a first value for the first service provider to deliver the message to the recipient device via a first channel; accessing a second data structure provided by a second service provider, the second data structure indicating a second value for the second service provider to deliver the message to the recipient device via a second channel; accessing a first quality score describing a first likelihood that the message will be received by the recipient device if delivered by the first service provider; accessing a second quality score describing a second likelihood that the message will be received by the recipient device if delivered by the second service provider; selecting the first service provider to deliver the message to the recipient device based on the first set of criteria associated with the first account, the first data structure, the second data structure, the first quality score and the second quality score; and causing the message to be transmitted to the recipient device via the first service provider.

In Example 14, the subject matter of Example 13, wherein the first channel is a short message service (SMS).

In Example 15, the subject matter of Examples 13-14, wherein the first channel is email.

In Example 16, the subject matter of Examples 13-15, wherein the first channel is a proprietary channel.

In Example 17, the subject matter of Examples 13-16, wherein the first channel is voicemail.

Example 18 is a non-transitory computer-readable medium storing instructions that, when executed by one or more computer processors of one or more computing devices, cause the one or more computing devices to perform operations comprising: receiving a request to transmit a message to a recipient device, the request associated with a first account; accessing a first set of criteria associated with the first account; accessing a first data structure provided by a first service provider, the first data structure indicating a first cost value for the first service provider to deliver the message to the recipient device via a first channel; accessing a second data structure provided by a second service provider, the second data structure indicating a second cost value for the second service provider to deliver the message to the recipient device via a second channel; accessing a first quality score describing a first likelihood that the message will be received by the recipient device if delivered by the first service provider; accessing a second quality score describing a second likelihood that the message will be received by the recipient device if delivered by the second service provider; selecting the first service provider to deliver the message to the recipient device based on the first set of criteria associated with the first account, the first data structure, the second data structure, the first quality score and the second quality score; and causing the message to be transmitted to the recipient device via the first service provider.

In Example 19, the subject matter of Example 18 includes, wherein the selecting of the first service provider to deliver the message comprises: calculating a first ranking value for the first data structure based on the first set of criteria, the first value, and the first quality score; calculating a second ranking value for the second data structure based on the first set of criteria, the second value, and the second quality score; ranking the first data structure and the second data structure based on the first ranking value and the second ranking value; and selecting the first service provider based on the ranking.

In Example 20, the subject matter of Example 19, wherein the calculating of the first ranking value comprises: determining a first weight value based on the first set of criteria; applying the first weight value to the first quality score, yielding a first weighted quality score; and determining the first ranking value based on the first value and the first weighted quality score.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Software Architecture

Figure 8:
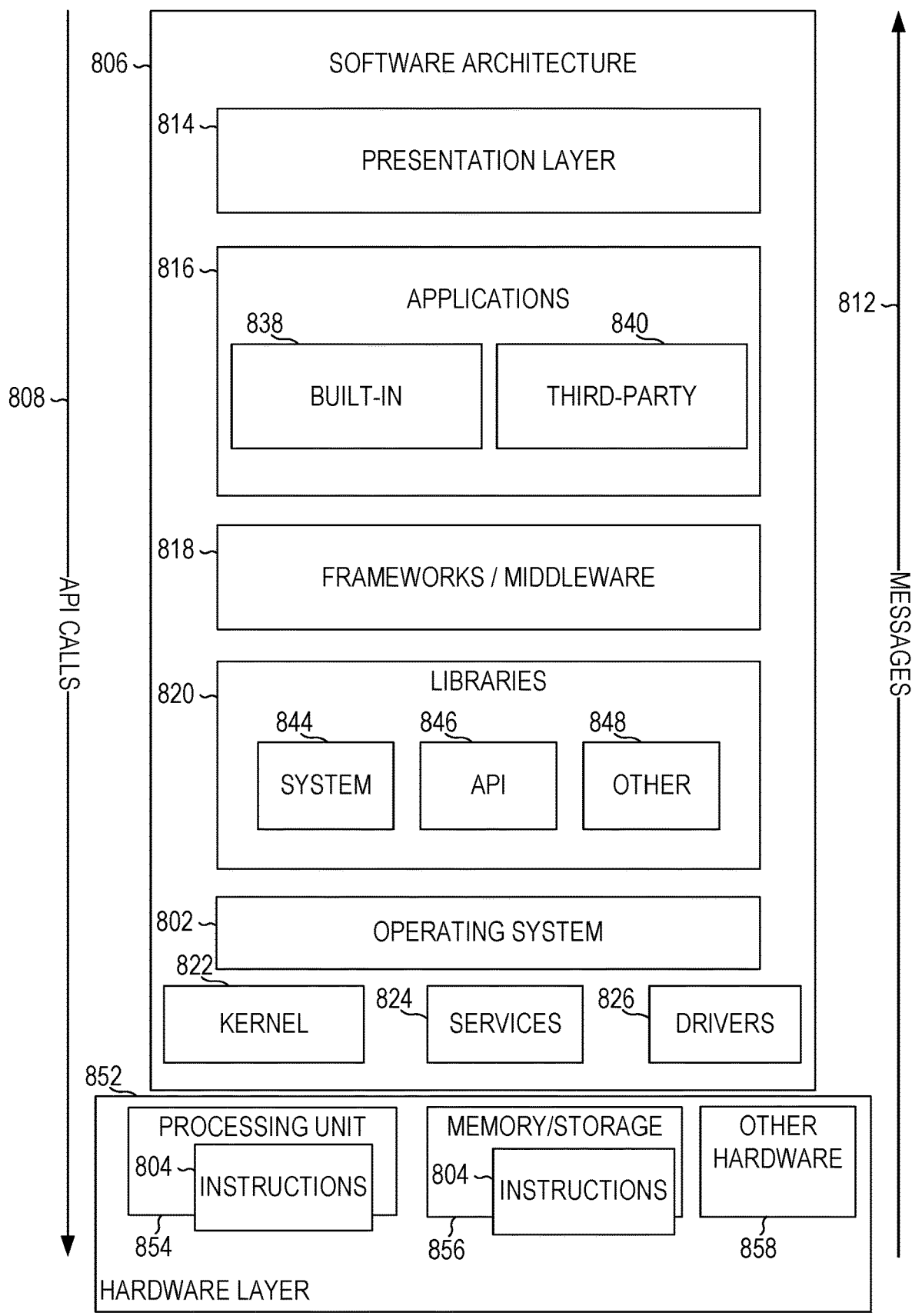
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 910, memory 930, and (input/output) I/O components 950. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
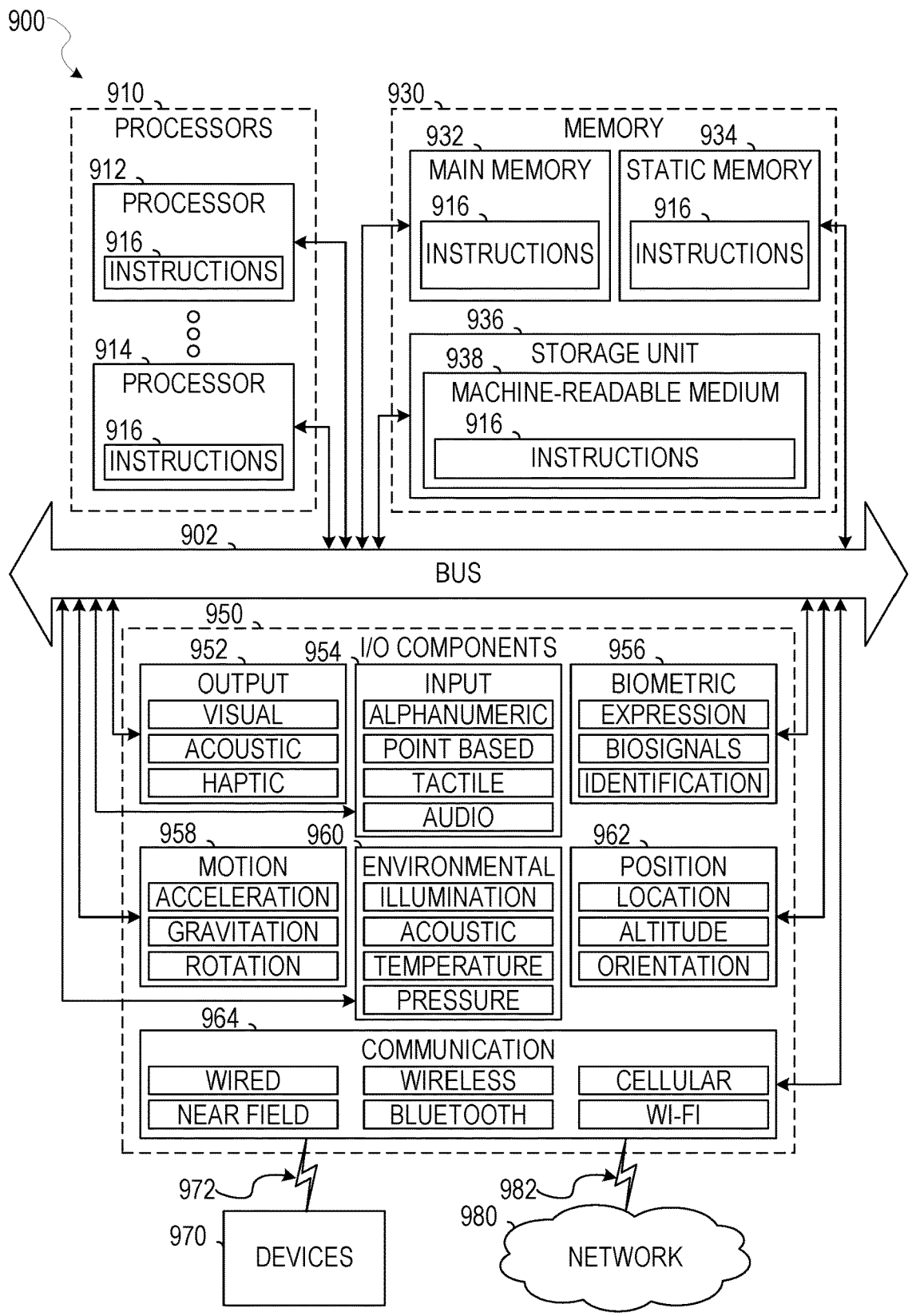
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. In alternative embodiments, the machine 900 operates as a stand-alone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (also referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936 accessible to the processors 910 via the bus 902. The storage unit 936 may include a machine-readable medium 938 on which are stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, in various implementations, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, in some implementations, the communication components 964 detect identifiers or include components operable to detect identifiers. For example, the communication components 964 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Glossary

"CARRIER SIGNAL" in this context refers to any intangible medium that is capable of storing, encoding, or carrying instructions 916 for execution by the machine 900, and includes digital or analog communications signals or other intangible medium to facilitate communication of such instructions 916. Instructions 916 may be transmitted or received over the network 980 using a transmission medium via a network interface device and using any one of a number of well-known transfer protocols.

"CLIENT DEVICE" in this context refers to any machine 900 that interfaces to a communications network 980 to obtain resources from one or more server systems or other client devices 110, 120. A client device 110, 120 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 980.

"COMMUNICATIONS NETWORK" in this context refers to one or more portions of a network 980 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 980 or a portion of a network 980 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 916 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions 916 (e.g., code) for execution by a machine 900, such that the instructions 916, when executed by one or more processors 910 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 910 or other programmable processor 910. Once configured by such software, hardware components become specific machines 900 (or specific components of a machine 900) uniquely tailored to perform the configured functions and are no longer general-purpose processors 910. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 910 configured by software to become a special-purpose processor, the general-purpose processor 910 may be configured as respectively different special-purpose processors (e.g., comprising different hardware components) at different times. Software accordingly configures a particular processor or processors 910, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information). The various operations of example methods described herein may be performed, at least partially, by one or more processors 910 that are temporarily configured (e.g., by software) or permanently configured to perform the relevant operations. Whether temporarily or permanently configured, such processors 910 may constitute processor-implemented components that operate to perform one or more operations or functions described herein. As used herein, "processor-implemented component" refers to a hardware component implemented using one or more processors 910. Similarly, the methods described herein may be at least partially processor-implemented, with a particular processor or processors 904 being an example of hardware. For example, at least some of the operations of a method may be performed by one or more processors 910 or processor-implemented components.

Moreover, the one or more processors 910 may also operate to support performance of the relevant operations in a "cloud computing" environment or as a "software as a service" (SaaS). For example, at least some of the operations may be performed by a group of computers (as examples of machines 900 including processors 910), with these operations being accessible via a network 980 (e.g., the Internet) and via one or more appropriate interfaces (e.g., an API). The performance of certain of the operations may be distributed among the processors 910, not only residing within a single machine 900, but deployed across a number of machines 900. In some example embodiments, the processors 910 or processor-implemented components may be located in a single geographic location (e.g., within a home environment, an office environment, or a server farm). In other example embodiments, the processors 910 or processor-implemented components may be distributed across a number of geographic locations.

"PROCESSOR" in this context refers to any circuit or virtual circuit (a physical circuit emulated by logic executing on an actual processor 910) that manipulates data values according to control signals (e.g., "commands," "op codes," "machine code," etc.) and which produces corresponding output signals that are applied to operate a machine 900. A processor 910 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 910 may further be a multi-core processor having two or more independent processors 910 (sometimes referred to as "cores") that may execute instructions 916 contemporaneously.

What is claimed is:
1. A method comprising:
receiving, by one or more processors of a multi-channel message exchange system, a request to transmit a message to a recipient device, the request associated with a first account;
accessing, by the multi-channel message exchange system and from a criteria storage that stores criteria for a plurality of accounts, a first set of criteria associated with the first account;
accessing, by the multi-channel message exchange system, a first data structure provided by a first service provider, the first data structure indicating a first value for the first service provider to deliver the message to the recipient device via a first channel;
accessing, by the multi-channel message exchange system, a second data structure provided by a second service provider, the second data structure indicating a second value for the second service provider to deliver the message to the recipient device via a second channel;
accessing, by the multi-channel message exchange system, a first quality score describing a first likelihood that the message will be received by the recipient device if delivered by the first service provider;
accessing, by the multi-channel message exchange system, a second quality score describing a second likelihood that the message will be received by the recipient device if delivered by the second service provider;
selecting, by the multi-channel message exchange system, the first service provider to deliver the message to the recipient device based on the first set of criteria asso- ciated with the first account, the first data structure, the second data structure, the first quality score and the second quality score; and causing, by the multi-channel message exchange system, the message to be transmitted to the recipient device via the first service provider.

2. The method of claim 1, wherein the first channel is a short message service (SMS) client.

3. The method of claim 1, wherein the first channel is email.

4. The method of claim 1, wherein the first channel is a proprietary channel.

5. The method of claim 1, wherein the first channel is voicemail.

6. The method of claim 1, wherein the selecting of the first service provider to deliver the message comprises:
calculating a first ranking value for the first data structure based on the first set of criteria, the first value, the first channel, and the first quality score;
calculating a second ranking value for the second data structure based on the first set of criteria, the second value, the second channel, and the second quality score;
ranking the first data structure and the second data structure based on the first ranking value and the second ranking value; and
selecting the first service provider based on the ranking.

7. The method of claim 6, wherein the calculating of the first ranking value comprises:
determining a first weight value based on the first set of criteria;
applying the first weight value to the first quality score, yielding a first weighted quality score; and
determining the first ranking value based on the first value and the first weighted quality score.

8. The method of claim 1, wherein the first set of criteria identifies a maximum value.

9. The method of claim 8, further comprising:
determining that the first value does not exceed the maximum value identified by the first set of criteria.

10. The method of claim 8, further comprising:
determining that a third value associated with a third data structure exceeds the maximum value identified by the first set of criteria, the third data structure being excluded from a set of data structures gathered for potential selection to deliver the message, the set of data structures gathered for potential selection to deliver the message including the first data structure and the second data structure.

11. The method of claim 1, further comprising:
receiving, via an application programming interface, a modification of the first set of criteria associated with the first account.

12. The method of claim 1, wherein the request identifies a maximum latency for transmitting the message.

13. A multi-channel message exchange system comprising:
one or more computer processors; and
one or more computer-readable mediums storing instructions that, when executed by the one or more computer processors, cause the multi-channel message exchange system to perform operations comprising:
receiving a request to transmit a message to a recipient device, the request associated with a first account;
accessing, from a criteria storage that stores criteria for a plurality of accounts, a first set of criteria associated with the first account;
accessing a first data structure provided by a first service provider, the first data structure indicating a first value for the first service provider to deliver the message to the recipient device via a first channel;
accessing a second data structure provided by a second service provider, the second data structure indicating a second value for the second service provider to deliver the message to the recipient device via a second channel;
accessing a first quality score describing a first likelihood that the message will be received by the recipient device if delivered by the first service provider;
accessing a second quality score describing a second likelihood that the message will be received by the recipient device if delivered by the second service provider;
selecting the first service provider to deliver the message to the recipient device based on the first set of criteria associated with the first account, the first data structure, the second data structure, the first quality score and the second quality score; and
causing the message to be transmitted to the recipient device via the first service provider.

14. The multi-channel message exchange system of claim 13, wherein the first channel is a short message service (SMS).

15. The multi-channel message exchange system of claim 13, wherein the first channel is email.

16. The multi-channel message exchange system of claim 13, wherein the first channel is a proprietary channel.

17. The multi-channel message exchange system of claim 13, wherein the first channel is voicemail.

18. A non-transitory computer-readable medium storing instructions that, when executed by one or more computer processors of a multi-channel message exchange system, cause the multi-channel message exchange system to perform operations comprising:
receiving a request to transmit a message to a recipient device, the request associated with a first account;
accessing, from a criteria storage that stores criteria for a plurality of accounts, a first set of criteria associated with the first account;
accessing a first data structure provided by a first service provider, the first data structure indicating a first cost value for the first service provider to deliver the message to the recipient device via a first channel;
accessing a second data structure provided by a second service provider, the second data structure indicating a second cost value for the second service provider to deliver the message to the recipient device via a second channel;
accessing a first quality score describing a first likelihood that the message will be received by the recipient device if delivered by the first service provider;
accessing a second quality score describing a second likelihood that the message will be received by the recipient device if delivered by the second service provider;
selecting the first service provider to deliver the message to the recipient device based on the first set of criteria associated with the first account, the first data structure, the second data structure, the first quality score and the second quality score; and
causing the message to be transmitted to the recipient device via the first service provider.

19. The non-transitory computer-readable medium of claim 18, wherein the selecting of the first service provider to deliver the message comprises:
- calculating a first ranking value for the first data structure based on the first set of criteria, the first cost value, and the first quality score;
- calculating a second ranking value for the second data structure based on the first set of criteria, the second cost value, and the second quality score;
- ranking the first data structure and the second data structure based on the first ranking value and the second ranking value; and
- selecting the first service provider based on the ranking.

20. The non-transitory computer-readable medium of claim 19, wherein the calculating of the first ranking value comprises:
- determining a first weight value based on the first set of criteria;
- applying the first weight value to the first quality score, yielding a first weighted quality score; and
- determining the first ranking value based on the first cost value and the first weighted quality score.

* * * * *